(12) United States Patent
Meilstrup et al.

(10) Patent No.: US 7,233,404 B2
(45) Date of Patent: Jun. 19, 2007

(54) SYSTEM FOR PROCESSING PRINT JOBS

(75) Inventors: Jon Andrew Meilstrup, Longmont, CO (US); Nenad Rijavec, Longmont, CO (US); John Thomas Varga, Longmont, CO (US); Raymond Glenn Wardell, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 10/282,474

(22) Filed: Oct. 29, 2002

(65) Prior Publication Data

US 2004/0080767 A1 Apr. 29, 2004

(51) Int. Cl.
G06F 15/00 (2006.01)
G06F 15/16 (2006.01)

(52) U.S. Cl. ..................... 358/1.13; 709/206
(58) Field of Classification Search ............... 358/1.13, 358/1.15, 1.14, 1.16; 709/206, 245, 227, 709/221; 400/61, 70, 76; 705/35, 38, 206
See application file for complete search history.

(56) References Cited

U.S. PATENT DOCUMENTS

| | | | |
|---|---|---|---|
| 5,845,056 A | 12/1998 | Kohler et al. | 395/109 |
| 5,963,216 A | 10/1999 | Chiarabini et al. | 345/439 |
| 6,026,216 A | 2/2000 | Ohtsuka et al. | 395/109 |
| 6,043,909 A | 3/2000 | Holub | 358/504 |
| 6,075,614 A | 6/2000 | Ohtsuka et al. | 358/1.1 |
| 6,078,936 A | 6/2000 | Martin et al. | 707/527 |
| 6,108,009 A | 8/2000 | Nishikawa | 345/431 |
| 6,241,339 B1 | 6/2001 | Kondo | 347/43 |
| 6,775,019 B1* | 8/2004 | Sakurai et al. | 358/1.15 |
| 6,798,530 B1* | 9/2004 | Buckley et al. | 358/1.13 |
| 2003/0011805 A1* | 1/2003 | Yacoub | 358/1.15 |

* cited by examiner

Primary Examiner—King Y. Poon
Assistant Examiner—Saeid Ebrahimi
(74) Attorney, Agent, or Firm—Rabindranath Dutta; Konrad Raynes & Victor LLP

(57) ABSTRACT

A flexible and extensible job processing system is described. A print job processing server manages a plurality of data receivers and printer emulators. Data receivers receive jobs from the print job originators, such as print servers. The printer emulators convert the jobs into a plurality of intermediate output formats, with error, status and control information being available for both storage and reporting back to the print job originator. A user interface client is used to communicate with a plurality of job processing systems. The client can be used to view and possibly edit the job and device information available by the print job originator, configure the printer emulators in the system and the system itself, view the job status and error information, including printer traces, and view and possibly edit the data output of the printer emulator. The system uses the output of the printer emulators for a variety of purposes, such as driving output devices. Configurable actions are taken on the data and status information as they are generated by the printer emulators.

14 Claims, 6 Drawing Sheets

SYSTEM FOR PROCESSING PRINT JOBS

FIELD AND BACKGROUND OF THE INVENTION

This invention relates to processing print jobs. More particularly, the invention relates to a flexible way of processing print jobs using print emulators instead of printers and using the resulting data, control and status information for a variety of purposes.

The concepts of a virtual printer and a printer emulator are widely known in the art. A virtual printer is the subject of U.S. Pat. No. 6,266,150; U.S. patent application Ser. No. 09/139,043 filed 24 Aug. 1998 and Ser. No. 09/277,056 filed 26 Mar. 1999; and a publication in the IBM Technical Disclosure Bulletin for 1 Apr. 2001, which are hereby incorporated hereinto by reference and to which the interested reader is referred. Such a virtual printer provides a flexible way to drive heterogeneous devices by integrating a printer emulator into the data flow. The emulator produces a simple intermediate data format that is easily handled by most output devices. In this way, only the control information handling and relatively simple data formatting must be designed to support each new output device.

There are many different printer emulators known in the art. They range from standalone PostScript interpreters that produce electronic output instead of driving a print engine, to printer development systems used internally by printer manufacturers that feature fully functional printer controllers with print head mechanisms replaced by hardware simulators.

In some applications, notably the OCE TrueProof (R) system, printer emulators are used to preview print jobs as they would appear on an actual printer. In this system, the printer emulator runs on a separate computer and is indistinguishable from a real printer to the print server.

The IBM Virtual Printer referenced above offers a greater degree of integration with the server and a wider variety of options for handling the printer output. However, it is tuned for a particular purpose of driving an output device, so its architecture is narrowly defined to optimize this function.

There is a need to provide a flexible system that would build on the virtual printer concept and provide a wider variety of system configurations and output handling options.

SUMMARY OF THE INVENTION

According to one aspect of the present invention, a job processing server manages a plurality of data receivers and printer emulators. Data receivers receive jobs from the print job originators, such as print servers. The printer emulators convert the jobs into a plurality of intermediate output formats, with the error, status and control information being available for both storage and reporting back to the print job originator.

According to another aspect of the present invention, a user interface client is used to communicate with a plurality of job processing systems. The client can be used to view and possibly edit the job and device information available by the print job originator, configure the printer emulators in the system and the system itself, view the job status and error information, including printer traces, and view and possibly edit the data output of the printer emulator.

According to yet another aspect of the invention, a system of preprocessing jobs uses the output of the printer emulators for a variety of purposes, such as driving output devices.

According to this aspect of the invention, configurable actions are taken on the data and status information as they are generated by the printer emulators.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
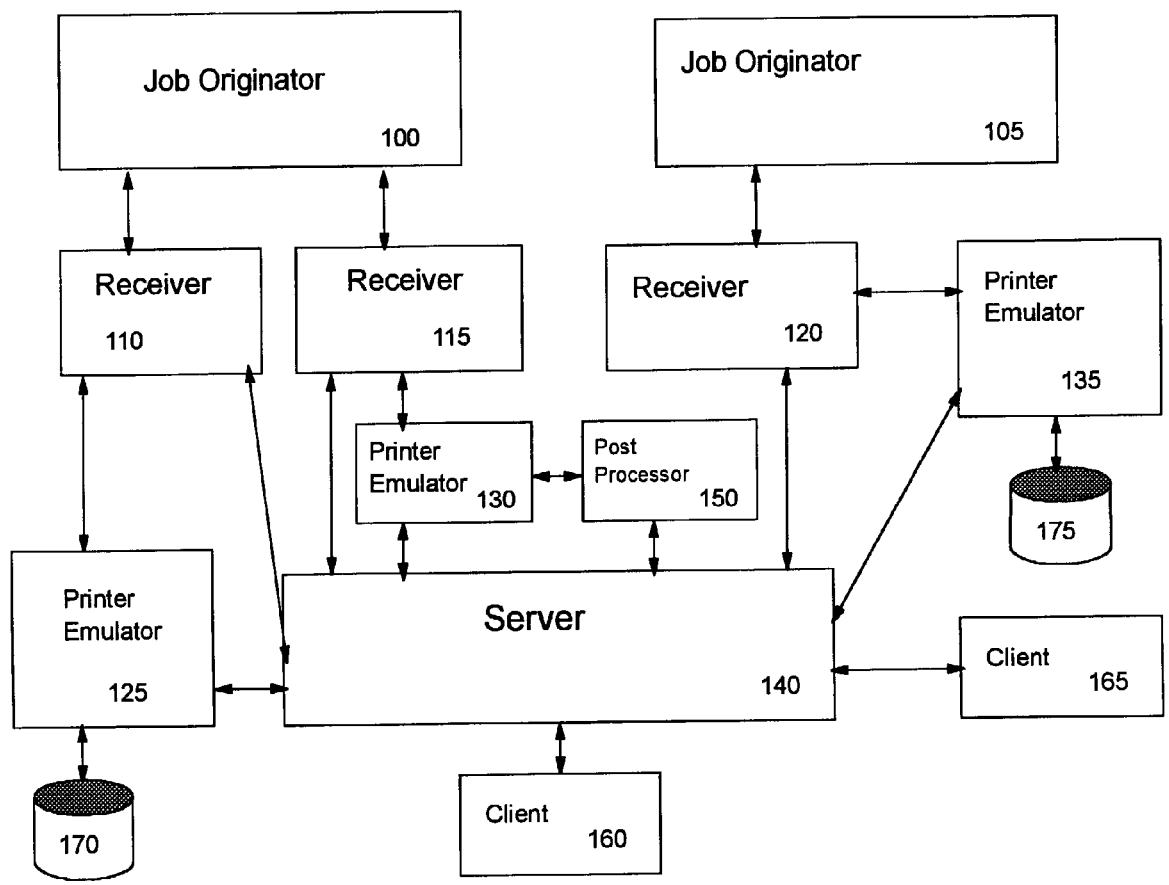
FIG. 1 is a block diagram illustrating an exemplary software architecture according to one embodiment of the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

A flexible and extensible job processing system is described. According to various embodiments of the present invention, job originators send jobs to the job processing system instead of an actual printer. From the perspective of the job originator, the job processing system may be indistinguishable from an actual printer. According to another aspect of the present invention, the job originator may be aware of the job processing system and use that knowledge to embed additional control information into the job data stream. Each job originator may be driving a plurality of devices, some of which may be actual output devices, while other may be receivers belonging to a plurality of the job processing systems.

Each print job is processed using a printer emulator. A printer emulator is defined to be any software program or a hardware device or a combination thereof that generates output in an electronic form instead of hard copy. According to one aspect of the present invention, a plurality of print emulators can also be used in parallel. The output of the print emulator consists of a plurality of data formats containing processed print data and optionally status, error and control information. The information other than the processed data output will be henceforth referred to as the control information. Term "virtual printer" will be used henceforth to denote a receiver/printer emulator combination, where it is understood that the printer emulator may be intermittently present or that each virtual printer may contain a plurality of printer emulators extant at any particular moment.

According to one aspect of the present invention, the output of each printer emulator (including the control information, if available) is stored for viewing. According to another aspect of the present invention, the output of the printer emulator is submitted to a set of actions, such as submission to a post processing device. The action can occur either synchronously, as the output is being generated, or asynchronously with varying frequencies, such as sheet or job boundaries.

According to another aspect of the present invention, a client program is used to communicate with the job processing system. The client, which according to one aspect of the present invention, contains a graphical user interface (GUI), allows the user to view and possibly manipulate the job output, define actions to be taken, configure the behavior of the whole system in general and each printer emulator in particular.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embedded in machine-executable instructions, which may be used to cause a general-purpose or special-purpose processor programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices), to perform a process according to the present invention. The machine-readable medium may include, but is not limited to, floppy diskettes, optical disks, CD-ROMs, magneto-optical disks, ROMs, RAMs, EPROMs, EEPROMs, magnetic or optical cards, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or a network connection).

For convenience, embodiments of the present invention will be described with the reference to a particular data stream, i.e., Intelligent Printer Data Stream (IPDS). In alternative embodiments, alternative data streams may be employed, such as PostScript, Hewlett-Packard Printer Control Language (PCL), Printer Job Language (PJL) or Apple Talk Printer Access Protocol (PAP). However, preferably, the data stream employed is both architected and bidirectional. By "architected" what is meant is, a standardized set of controls is transmitted with raw data which specifies how the data is to be presented. By "bidirectional" what is meant is, a synchronization mechanism is provided between the host (e.g., a print server or other data stream generator) and the receiver (e.g., a printer or other output device) allowing them to synchronize at various points in the data stream. For example the host and the receiver may be able to synchronize at a command or page-level according to an acknowledgment protocol which provides for the exchange of host-initiated queries and receiver reply information. Also, while embodiments of the present invention will be described with reference to a particular transport level protocol (also referred to as a carrying protocol or communications protocol), i.e., transmission control protocol (TCP), other protocols that provide error-free, bidirectional byte stream between two endpoints may be employed, such as Xerox Network Systems (XNS), S/370 Parallel Channel Host Attachment, or the like.

An Exemplary Software Architecture

FIG. 1 illustrates an exemplary software architecture according to one embodiment of the present invention. According to the embodiment depicted, the job processing system includes one or more job originators 100, 105, one or more receivers 110, 115, 120, one or more printer emulators, 125, 130, 135, a control server 140 (henceforth referred to as "server"), one or more post processors 150 and one or more clients 160, 165. In various embodiments, more or less components may be employed by combining or excluding one or more above-referenced components or adding additional components. Importantly, the components may reside on the same computer system or be distributed across several different computer systems on a local area network, for example. FIG. 1 illustrates one possible distribution of the components in which the dashed lines represent a physical separation between components. When the components are physically separated, bidirectional communication links may be established and maintained among the components via a TCP/IP, socket-based interface, for example.

In one embodiment, the job originators 100, 105 may comprise a current or a future release of Infoprint Manager, or other IPDS-enabled print server. Different job originators may be present in the same system. According to the embodiment depicted in FIG. 1, the server instantiates and controls receivers 110, 115 and 120. The receivers accept connections from the job originators 100 and 105 in the same manner as the actual output devices.

According to the embodiment being depicted, each receiver uses a printer emulator 125, 130, 135 to process the job. It will be obvious to those skilled in the art that each receiver might utilize multiple printer emulators in parallel. Printer emulators 125, 130 and 135 may either be instantiated for each job or be persistent. In the preferred embodiment according to the present invention, the printer emulators are started by the server, but they could also be started by the receiver. If the printer emulators are persistent across multiple jobs, each may communicate by a plurality of receivers.

According to the embodiment being depicted, printer emulator 130 communicates its output to post processor 150, which also communicates with the server 140.

Additionally, the server 140 communicates with a plurality of clients 160, 165 that are used to accept user commands and present the job output.

Importantly, all the communications between the various system components are shown to be bidirectional. While this allows for maximum functionality, it will be clear to those skilled in the art that various of the connections in the FIG. 1 could be unidirectional.

In the preferred embodiment, the presentation device protocol exchanged between the job originators 100, 105 and the receivers 110, 115, 120 is the Intelligent Printer Data Stream (IPDS). IPDS is an architected, bidirectional printer data stream that contains both data and controls defining how the data is to be presented. Additionally, IPDS architecture provides an extensive acknowledgment protocol at the data stream level which provides for exchange of query-reply information and allows the return of detailed exception information. IPDS data streams are independent of the carrying communication protocol. This allows the transmission of the same data stream to presentation devices attached to channels, controllers, local area network, and any other type of networking link that supports the transparent transmission of data. IPDS transfers data and controls through commands that describe the presentation of data and provide for dynamic management of resident fonts and of downloaded resources, such as overlays, page segments, and loaded fonts. Additionally, IPDS commands allow control of device functions such as duplexing, media-bin selection, and output finishing. Further background and information regarding the IPDS architecture may be found in a publication titled "Intelligent Printer Data Stream Reference," Order Number S544-3417, published March 1996, which is available from the IBM Printing Systems Division of Boulder, Colo.

Importantly, while this embodiment is described with reference to a job originator supplying a printer data stream, such as IPDS, to the receivers 110, 115, 120, the present invention is not limited to receipt of printer data stream from any particular type of device. In alternative embodiments, the data stream may be received directly or indirectly from a workstation or other data stream generator or may be read from a scripted file, for example.

In the preferred embodiment as depicted in FIG. 1, printer emulator 130 communicates its output (including output data and/or control information) to an output post processor 150. The output post processor may be configured either on device, job or data stream basis. According to one embodiment of the present invention, the printer emulator may produce a raster image suitable for high speed printing, such as Image Object Content Architecture (IOCA) embedded in Mixed Object Document Content Architecture (MO:DCA) and the post processor may requeue the output job for printing on a print server which can be the same as the job originator 100 or different.

As depicted in FIG. 1, printer emulators 125 and 135 store the output on a storage device, such as magnetic disks 170, 175, for later use.

According to one embodiment of the present invention, users can utilize clients 160, 165 to instruct the server 140 to submit job output stored on disks 170, 175 for post processing using arbitrary post processor. Such a post processing action may, for example, be defined by the user via specifying an arbitrary command line and the process invoked thereby by the server could receive as input either the filenames on the command line, or data via standard input, or a combination thereof, or in some other manner.

It is important to note that, at user option, a behavior of a single virtual printer may change in the disposition of the printer emulator output. Thus each virtual printer may at some point store the output, while at other times it may submit the output to a variety of post processors. Importantly, a virtual printer may submit each output simultaneously to multiple output processors.

The data output of each printer emulator 125, 130, 135 can be in a variety of types, suited to the application. The printer may produce either a raster image in the native printer output space, such as 600 dots per inch 8 bit per channel CMYK, or a raster image in a different output space such as RGB raster data tuned to a particular display or a more complex data format. According to one embodiment of the present invention, the data may be encapsulated in a standard data stream format such as MO:DCA, PostScript, Portable Data Format (PDF) or Tagged Image File Format (TIFF). According to another embodiment, the data format may be arbitrary, tuned for a particular purpose.

In the preferred embodiment of the present invention depicted in FIG. 1, each printer emulator can generate a plurality of data types, encapsulated in a variety of formats, switchable dynamically.

Control Flow Through An Exemplary Server

Figure 2:
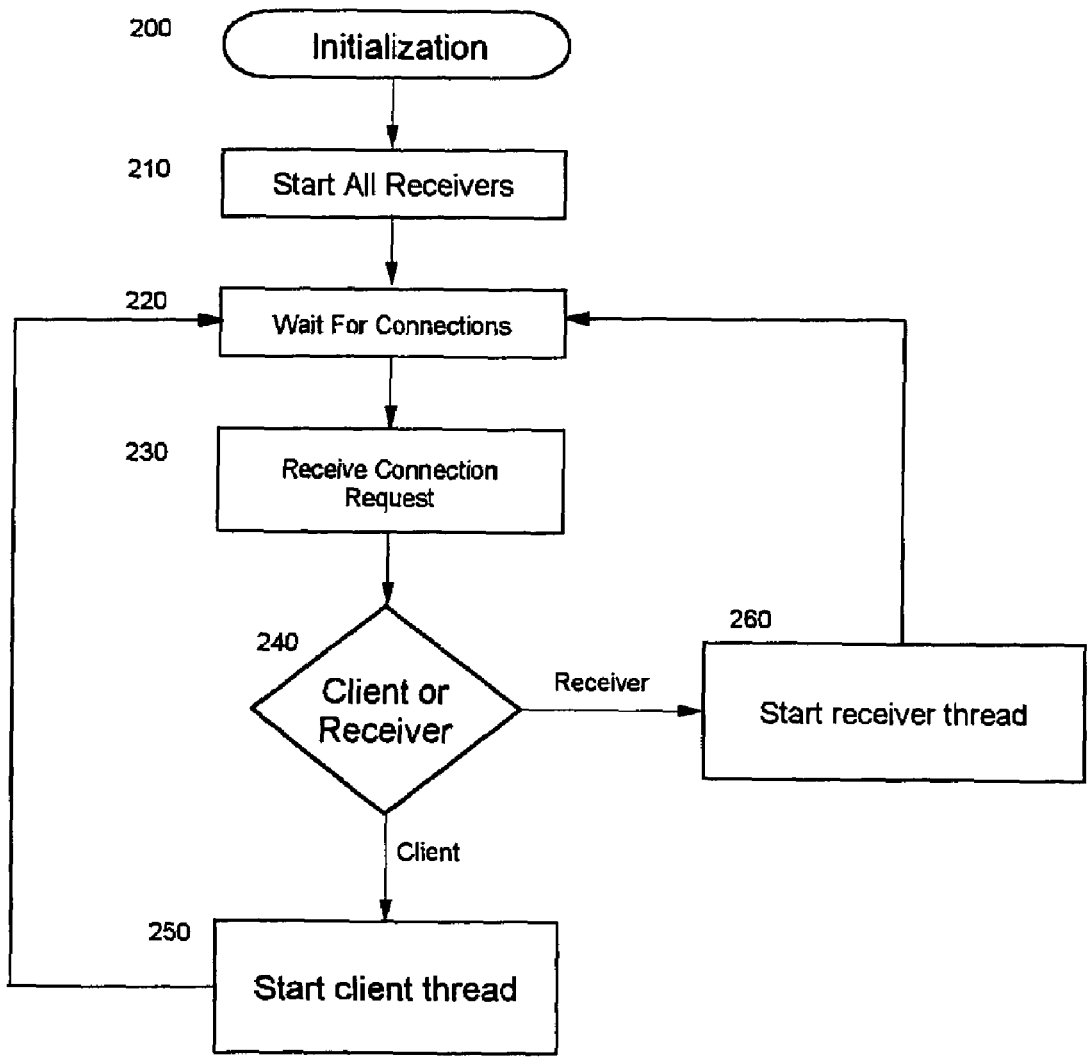
FIG. 2 is a flow diagram illustrating the server high level control flow according to one embodiment of the present invention.

Having briefly described the main components of the system architecture according to one embodiment of the present invention, the control flow in the server in the preferred embodiment will be described next with the reference to FIGS. 2, 3 and 4. FIG. 2 is a high level flow diagram illustrating the main thread control flow of the server.

At step 200, the server starts by initializing, reading the setup parameters and loading persistent information, such as the virtual printers and jobs known to the system. In the next step 210, the server starts the receivers for all the virtual printers. The receiver control flow is described in FIG. 5 and is started directly from step 210.

After all the receivers have been started, the server waits for connection requests in step 220. The wait can be implemented in a variety of ways, such as sockets, locks or semaphores. In the preferred embodiment of the present invention, the server listens to two sockets, on for the receiver connections, the other for the client connections. In an another embodiment, only one socket may be employed, and the type of the connection can be determined from the connection signature provided in the connection message received by the server.

In the step 230, a connection request is received. In step 240, different control paths are entered depending on whether the connection is a client or receiver connection. If the connection is a client connection, the server starts a client thread for handling of the connection in step 250. The client control flow is described in FIG. 3 and step 310 therein is immediately caused by the step 250 in FIG. 2. After the client thread has been started, the control returns to step 220 to wait for the next connection.

If the connection is determined to be a receiver connection in step 240, the receiver handling thread is started by the server in step 260. Connection thread control flow is described in FIG. 4 and step 400 in FIG. 4 is immediately caused by step 260 in FIG. 2. After step 260, the control flow returns to step 220 to wait for another connection request.

It will be clear to those skilled in the art that the main control loop described above must execute quickly, since only one connection request can be handled at the time. Most modern operating systems, such as Unix, will queue the connection requests if the process is busy, but too many requests will overflow the queue and result in refused connections. To shorten the time needed to handle each event, an alternative embodiment to the present invention would spawn a connection-handling thread immediately upon receiving a connection request in step 230 and return to the step 220. Steps 240–260 could then be processed by the new thread that could then either terminate or continue as a client or receiver handling thread.

Figure 3:
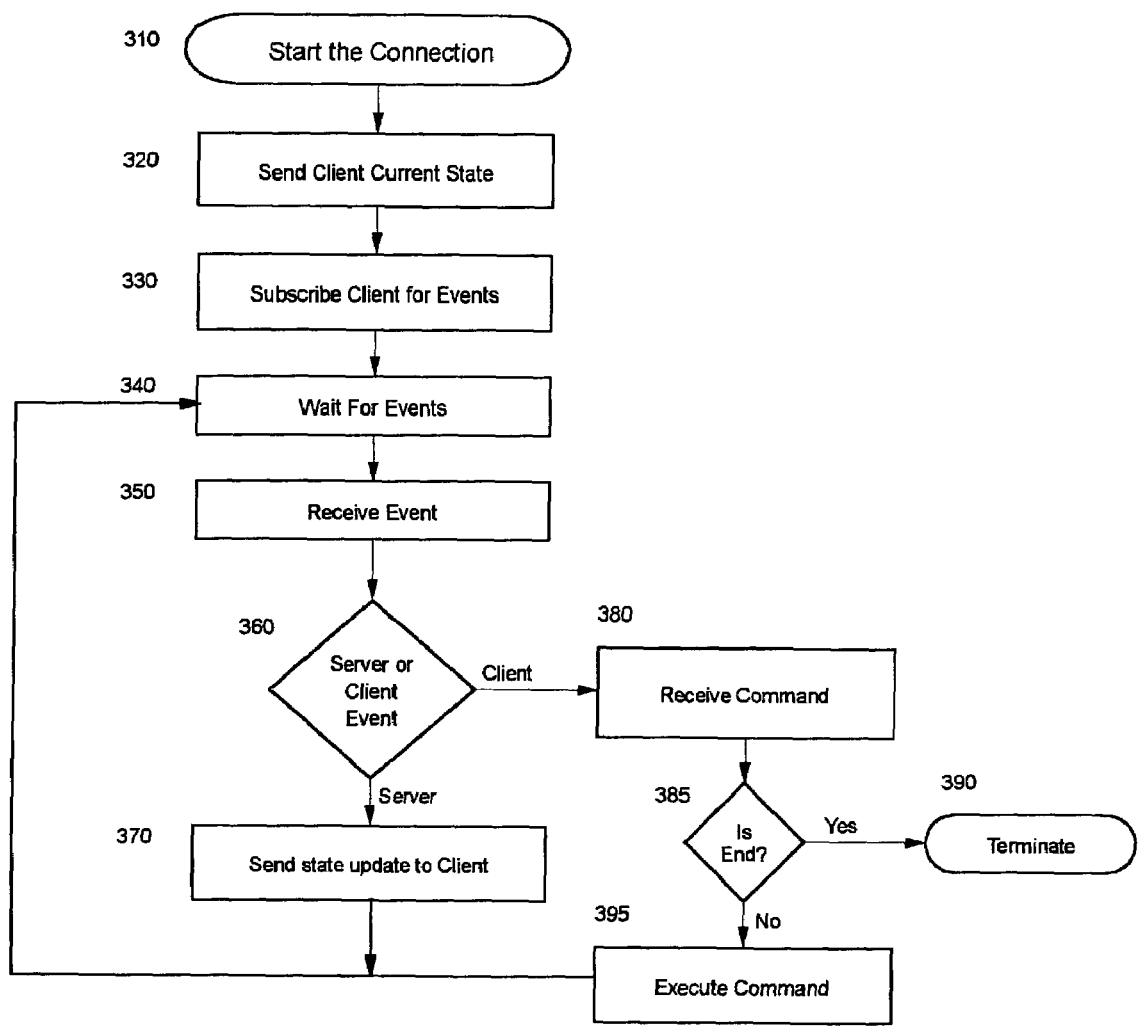
FIG. 3 is a flow diagram illustrating the server client connection thread high level control flow according to one embodiment of the present invention.
Figure 4:
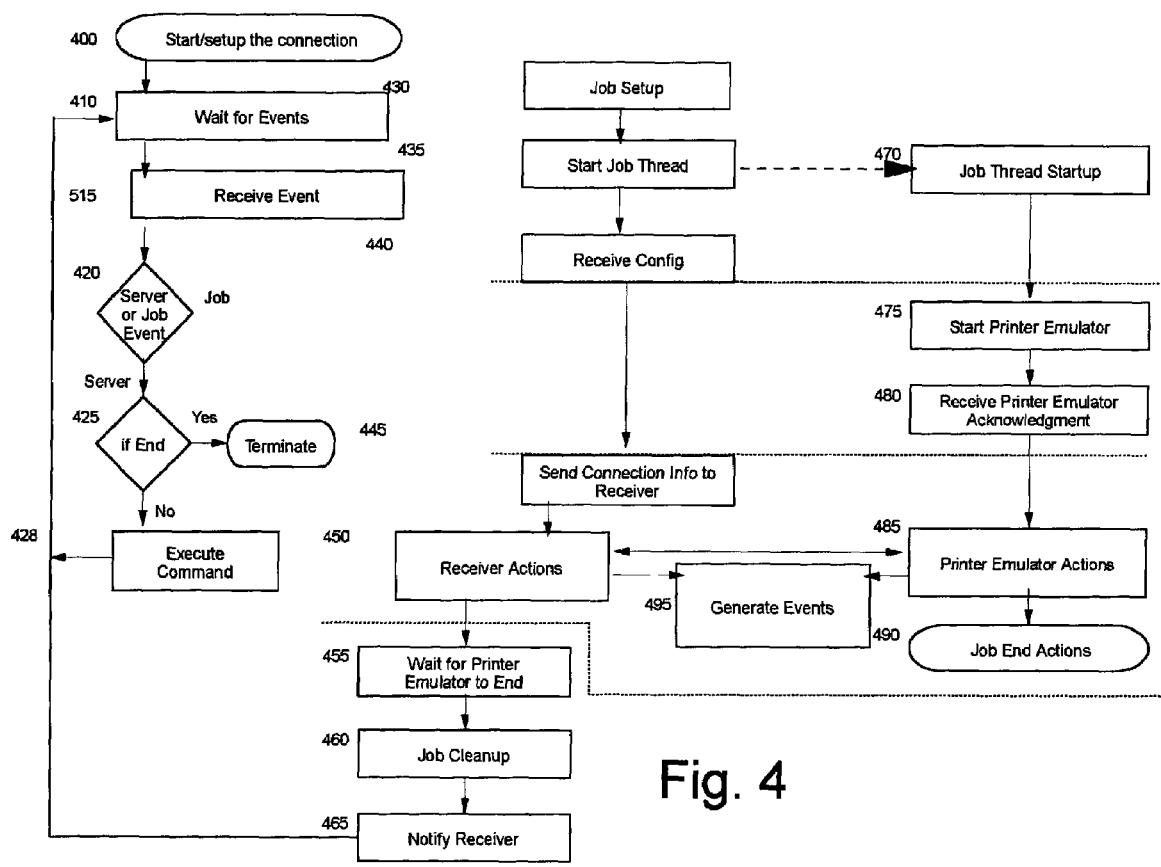
FIG. 4 is a flow diagram illustrating the server receiver connection thread high level control flow according to one embodiment of the present invention.

Importantly, it must be noted that the control flows described in FIGS. 3 and 4, while appearing relatively linear, are according to the preferred embodiment of the current invention, implemented using a plurality of threads and this issue does not arise in their event handling loops.

We next turn to the high level control flow of the server client handling thread according to the preferred embodiment of the present invention described in FIG. 3. The control flow is started by step 250 in FIG. 2 and proceeds to step 310. In the step 310, the connection is set up, including any handshaking and access authorization. In the next step 320, the client is subscribed to a set of events. If a client is subscribed to an event, then the event (such as completion of a page in a print job) will be communicated to the client. In the simplest case, all clients are subscribed to all events, but the subscriptions can be restricted based on both user authority and user input.

In the next step 330, the current server state corresponding to the subscribed events is sent to the client. For example, if the client is subscribed to events regarding a certain printer, the server communicates to the client a list of the processed jobs currently available for that printer.

The control flow now enters the step 340 to wait for an event to occur. The event can be either a server event to which a client has been subscribed, or a message from the client. When an event is received in step 350, the control flow branches in step 360 depending on whether the event is a server event or a client message. If the event is server event, the update to the state is sent to the client in step 370, after which control returns to the step 340 to wait for another event.

If the event is a client message, the server receives and parses the message in step 380. If, in the step 385, the message is found to contain the exit command, the connection is terminated in step 390, including all the necessary cleanup and the thread terminates. Otherwise, the command is executed by the server in step 395, after which the control flow returns to step 340 to wait for the next event.

FIG. 4 describes the high end control flow of the receiver handler according to the preferred embodiment of the present invention. Step 400 initializes the connection after being started by the step 260 in FIG. 2.

The control flow now enters the step 410 to wait for an event to occur. The event can be either a server event where server requires action, or a job event, where the receiver reports starting of a job. Once an event is received in step 415, it is classified into server or job event in step 420.

If the event is a server event, the control flow continues in the step 425, where the command is classified to be a termination command or not. If the command is the termination command, the receiver processing ends. Otherwise, the command is executed in step 428, after which the control flow returns to step 410 to wait for the next event.

If the event is determined to be a job event in step 420, the job setup actions are performed in step 430. The flow now splits into two parallel concurrent paths in the step 435, where the job handler thread is started. After the job handler thread finishes setup in step 470 (setup can include reading default printer emulator configuration), it blocks until the main receiver thread receives the job and device configuration data from the receiver in step 440. Synchronization can be implemented in a number of ways known in the art, such as semaphores, and is indicated in the figure by dashed lines.

After the configuration data is received (and possibly stored) in step 440, the job handler thread unblocks, parses any job-related configuration parameters obtained in step 440, uses them to modify the default printer emulator setup and then starts the printer emulator in step 475. The main thread blocks until the job thread receives an acknowledgment from the printer emulator that the startup is complete and that the emulator is ready to accept data in step 480. After that, the main thread unblocks and in step 445 sends the receiver the information it needs to establish a direct connection to the printer emulator.

While our preferred embodiment uses a direct connection for the efficiency purposes, it will be clear to those skilled in the art that this connection is not needed and that the communication between the receiver and the printer emulator can also be conducted through the server.

Now the main thread enters step 450 where it monitors the communication from the receiver, while the job thread monitors the communication from the printer emulator in step 485. In both cases, the threads generate server events in step 495. For example, the printer emulator may inform the server that another sheet side has been output, in which case all the event will notify all the subscribed clients that another sheet side is available for viewing. After the main thread receives notification that the job has ended, it exits step 450 and waits in step 455 for the job handling thread to end.

After the job handling thread is notified by the printer emulator that the job processing has been finished, it performs the closing actions in step 490 and terminates. Main thread unblocks, performs additional closing and cleanup actions in step 460 (e.g., generates an event telling clients that the job is complete), notifies the receiver in step 465 that it is free to accept the next job and then returns control to step 410 to wait for the next event.

Control Flow Through an Exemplary Receiver

Figure 5:
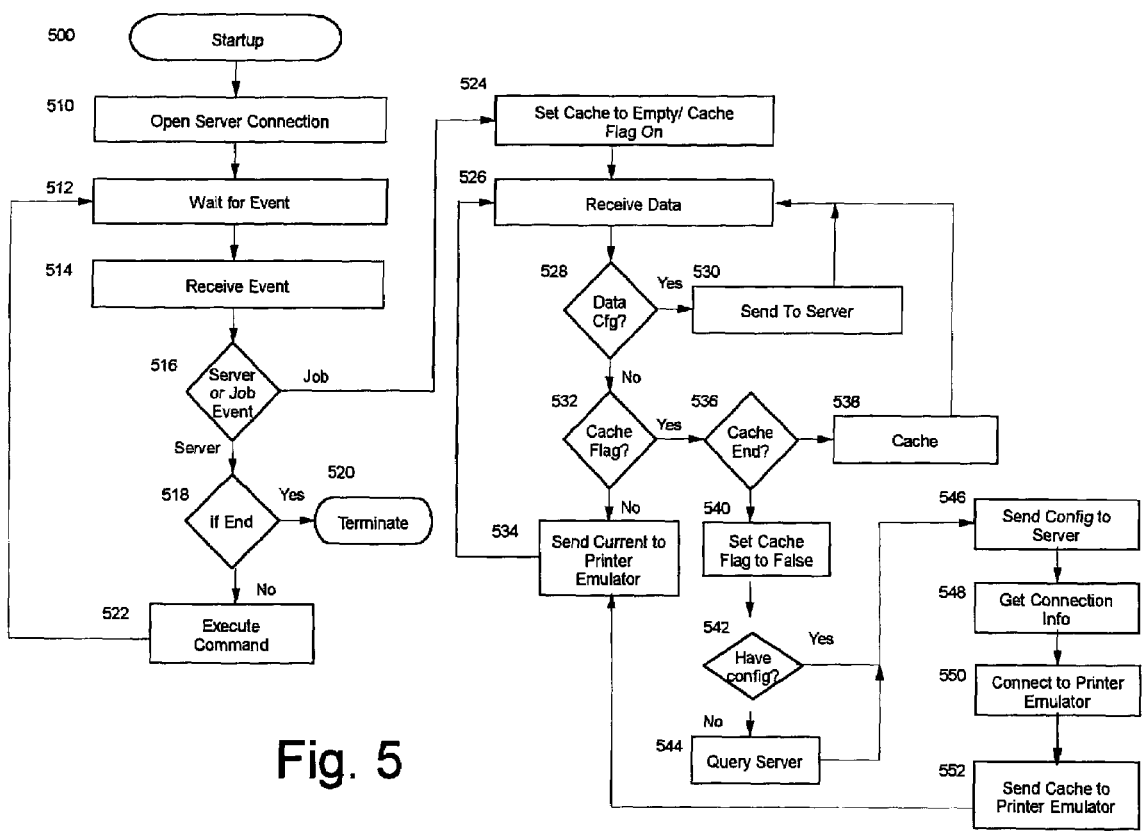
FIG. 5 is a flow diagram illustrating the receiver high level control flow according to one embodiment of the present invention.

FIG. 5 describes the high level control flow in the receiver process according to one embodiment of the present invention. The receiver starts in the step 500, including preparing the input data connection from the job originator. According to one embodiment of the present invention, this entails opening a socket and listening thereto. In step 510, the receiver opens a connection to the server, which is processed in the step 240 in FIG. 2 server control flow.

The receiver then enters step 512 and waits for an event. An event is received in step 514 and can be either a server event (received from the server) or a job event. The type of event is determined in step 516. If the event is a server event, it contains a command, which is parsed in step 518. If the command is the termination command, the receiver performs the cleanup in step 520 and ends. Otherwise, the command is executed in step 522 and the control returns to the step 512 to wait for the next event.

If the event is determined in step 516 to be a job event, the receivers initializes the data cache to empty and sets the cache flag to on in step 524. In step 526, the receiver obtains some data from the job originator. In our preferred embodiment, the received data will comprise one IPDS command. It is easy for those skilled in the art to modify this processing logic for other granularity of the received data, such as multiple commands or a partial command, or both. The data may contain a particular type of an object container recognized by the receiver. If that is detected in step 528, the configuration data is stored in step 530. Importantly, under one aspect of the present invention, multiple object containers with the configuration data may be received and are stored cumulatively. The configuration data therein may contain both the active configuration of the device in the job originator, job information, as well as the instructions for processing the job in the system and final destination thereof via a post processing device.

If the command is not determined in the step 528 to contain configuration data, step 532 checks if the cache flag is on. If not, the data is sent to the printer emulator in step 534 and the control returns to step 526 to receive more data.

If the cache flag is on in step 532, the received data is next examined to see if it contains any of the commands that would prevent further caching of the data, such as a beginning of an actual page. If the data is determined not to be forcing the end of the caching in step 535, the data is written to the cache in step 538 and the control returns to the step 526 to receive more data.

If the data does contain the cache end in step 535, the cache flag is set to false in step 540. In step 542, the receiver checks if it has stored the expected configuration data obtained from the data stream. If not, the receiver optionally queries the job generator for the requisite information in step 544, or loads the defaults for the missing data. In all cases, the control next proceeds to the step 546 where the configuration data is sent to the server. The server returns to the receiver in step 548 the information ended to establish a direct connection to the printer emulator and the receiver establishes the connection in the step 550. Next, in step 552, the receiver sends all the contents of the cache to the printer emulator. The control then returns to step 534, where the current command is sent to the printer emulator.

In the IPDS data stream, the containers with the configuration can be embedded at any position in the data stream. The logic of the processing above defers invoking the printer emulator as long as possible, so all the relevant configuration information needed to start the printer emulator with the right parameters is available. It will be clear to those skilled in the art that this logic can be organized in a number of different ways.

Control Flow Through an Exemplary Client

Figure 6:
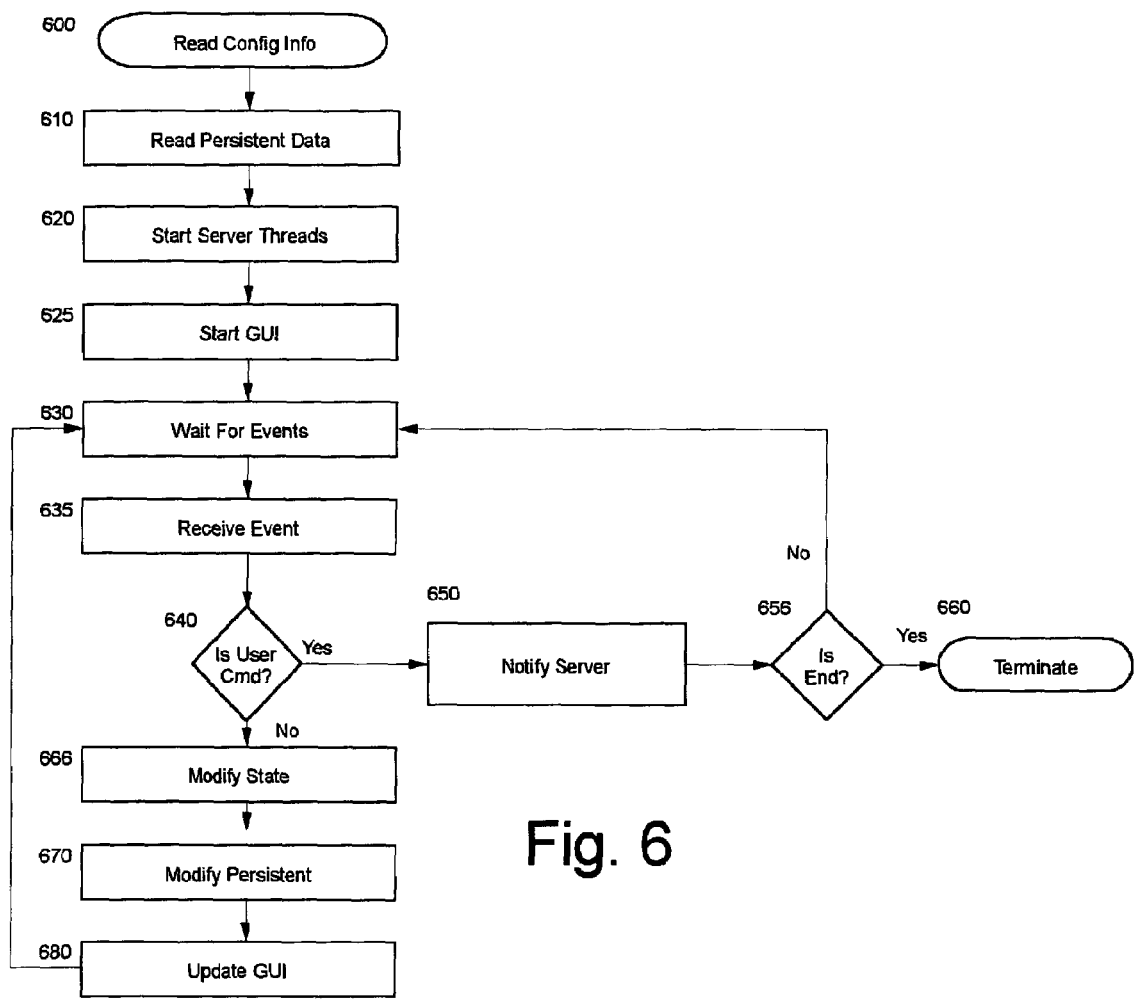
FIG. 6 is a flow diagram illustrating the client high level control flow according to one embodiment of the present invention.

FIG. 6 describes the high level control flow in the client process according to one embodiment of the current invention. The client starts in step 600 by reading the configuration data. In step 610, it reads the persistent session information that captures the pertinent parts of the client state at the time it terminated last, such as the server connection information. In step 620, the connections to all the servers are started and their states received, sent by the server in step 330 in FIG. 3, according to one embodiment of the current invention. The Graphical user Interface (GUI) is stated next in the step 625 and the data is presented to the user in one of the multiplicity of ways well known in the art.

The control next enters step 630 to wait for an event. After an event is received in step 635, it is determined in step 640 if it is user command or a server event. If the event is a user command, the relevant servers are notified in step 650. If the command is determined to be the end command in step 656, the client performs the finishing actions in step 660 and terminates. Otherwise, the control returns to step 630 to wait for the next event. Note that the server is notified no matter the nature of the command.

If the event is determined to be a server event in step 640, the client state is modified in step 666, then the persistent information is modified (if appropriate) and stored in step 670. Finally, the GUI is updated in step 680, after which the control returns to step 630 to wait for the next event.

It will be clear to those skilled in the art that the above description details one embodiment of a part of the client that communicates with the server or servers. GUI interactions to actually accept user commands and display data to the users are well known in the art and are not displayed.

What is claimed is:

1. Apparatus comprising:
    at least one receiver enabling communication with a print job originator and which receives print data, obtains resources and reports error and status information;
    at least one printer emulator communicating with said at least one receiver to process print jobs into a plurality of output formats; and
    a control server communicating with said at least one receiver to instantiate and configure said printer emulator and manage control flow therefor and other processes executed by said apparatus and respond to commands and queries, wherein the apparatus is capable of handling print jobs of arbitrary complexity, wherein a plurality of printer emulators is used to generate output data of specified structure based on the nature of a plurality of post processors, and further wherein said plurality of post processors can process the printer emulator data at full speed consistent with their respective device capabilities.

2. Apparatus according to claim 1 further comprising a print server functioning as the print job originator and wherein said receiver queries said print server to obtain job and device configuration data.

3. Apparatus according to claim 1 wherein said receiver obtains job and device configuration data which is embedded into a print data stream delivered thereto.

4. Apparatus according to claim 1 wherein said receiver retains error and/or status information.

5. Apparatus according to claim 1 wherein said printer emulator is integrated with said receiver.

6. Apparatus according to claim 1 wherein said printer emulator generates a plurality of output formats to user specifications having at least a selected one of different data formats, different color spaces, and different resolutions.

7. Apparatus comprising:
    a system using printer emulators to process print jobs;
    a control server enabled to configure at least one printer emulator; and
    a client allowing a user to view and manipulate the print jobs in the system, wherein said client is enabled to configure each print emulator, wherein the apparatus is capable of handling print jobs of arbitrary complexity, wherein a plurality of said printer emulators is used to generate output data of specified structure based on the nature of a plurality of post processors, and further wherein said plurality of post processors can process the printer emulator data at full speed consistent with their respective device capabilities.

8. Apparatus according to claim 7 wherein said client is enabled to communicate with a plurality of job processing systems.

9. Apparatus according to claim 7 wherein said client is enabled to generate processing directives for reprocessing an original job.

10. Apparatus comprising:
    an information handling system having at least one printer emulator effective to process print jobs;
    at least one post processor operatively communicating with said information handling system and acting on the output of said printer emulator; and
    a control system communicating with said post processor to control the configuration of the said post processor, wherein the apparatus is capable of handling print jobs of arbitrary complexity wherein a plurality of said printer emulators is used to generate output data of specified structure based on the nature of a plurality of said post processors, and further wherein said plurality of post processors can process the printer emulator data at full speed consistent with their respective device capabilities.

11. Apparatus according to claim 10 wherein said post processor has backward status and error communication and further wherein output from said printer emulator output is presented to said post processor, wherein said post processor is different from a virtual printer, and wherein the virtual printer comprises a receiver and the at least one printer emulator.

12. Apparatus according to claim 10 wherein said print emulator processes the entirety of a print job before submitting the print job to said post processor.

13. Apparatus according to claim 10 wherein where said print emulator submits a print job to said post processor during generation thereof by said print emulator.

14. Apparatus according to claim 10 wherein at least one post processor is a printer or print server.

* * * * *